S. C. CARY & H. H. BRAND.
MACHINE FOR PRODUCING CORRUGATED FASTENERS.
APPLICATION FILED DEC. 31, 1913.
1,210,416.
Patented Jan. 2, 1917.
3 SHEETS—SHEET 3.
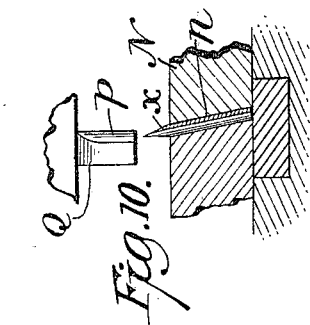
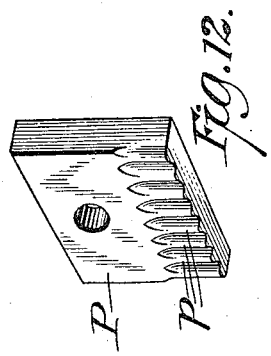
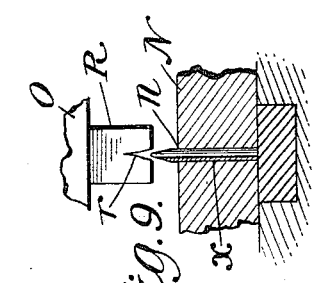
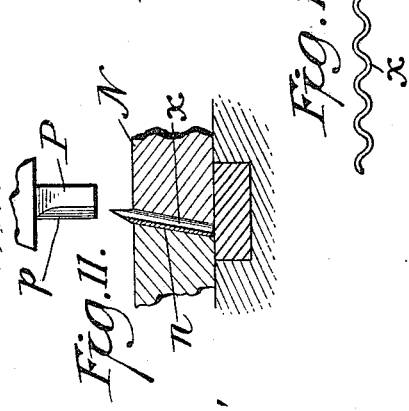
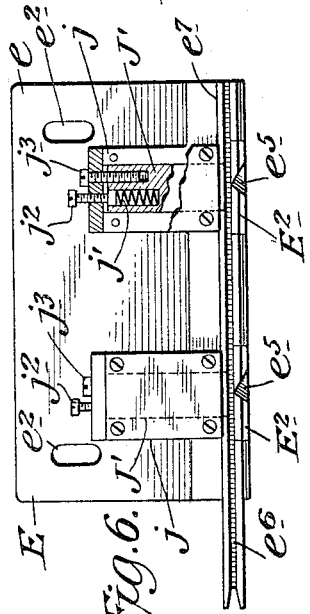
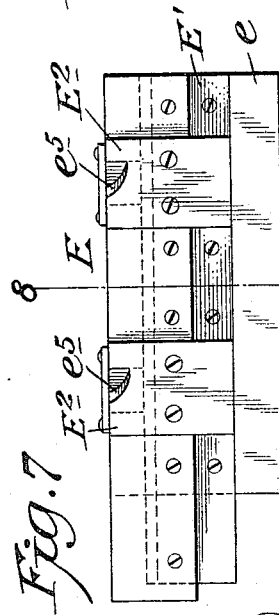
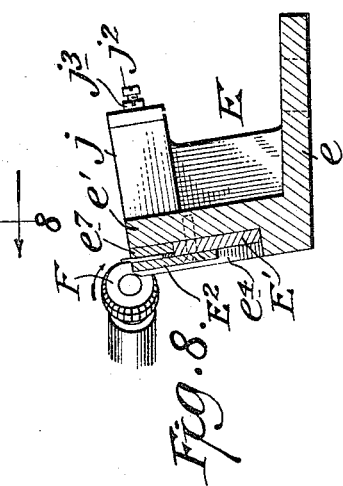
Witnesses:
Inventors
Spencer C. Cary
Herman H. Brand
By their Attorneys

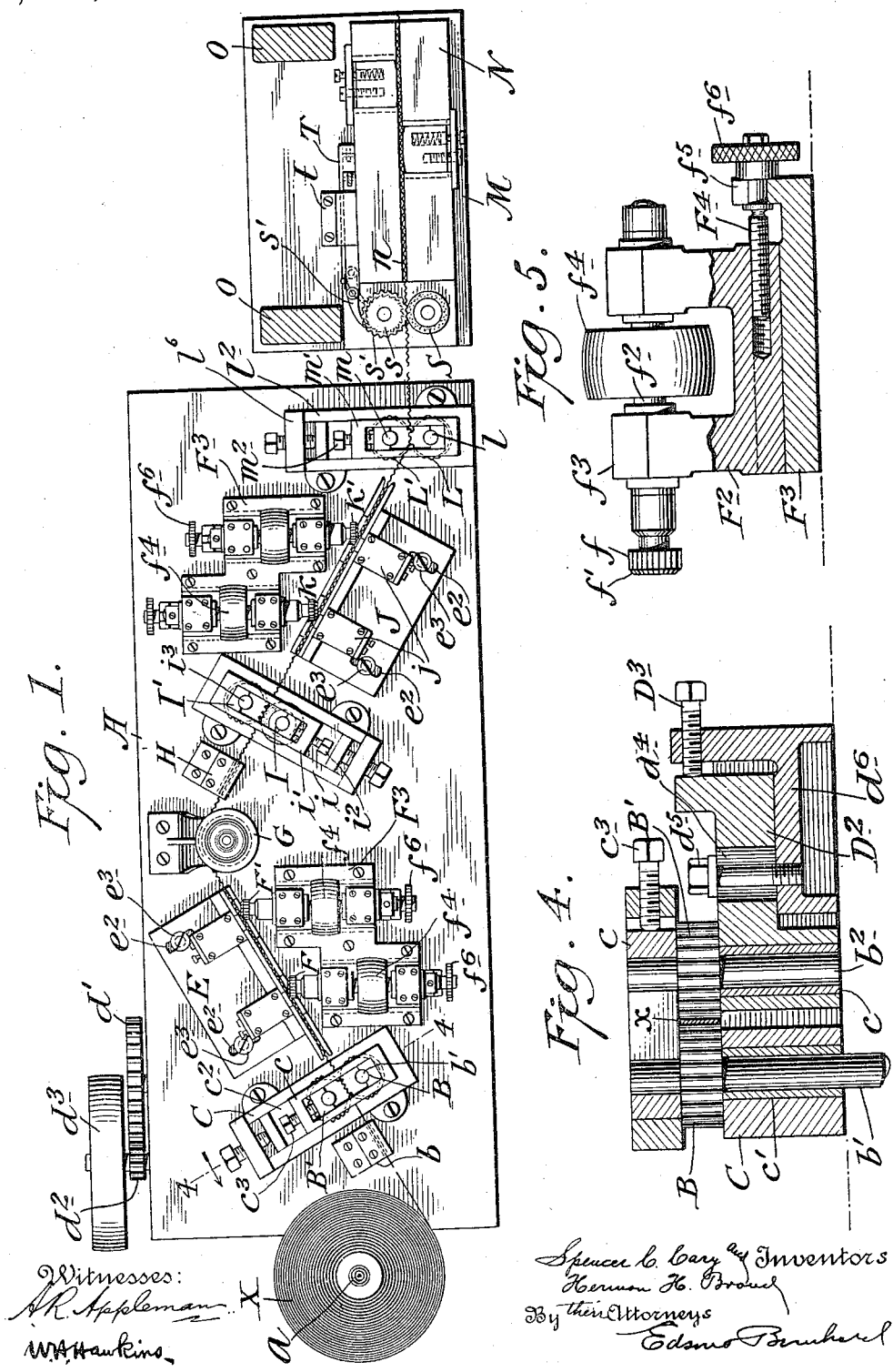

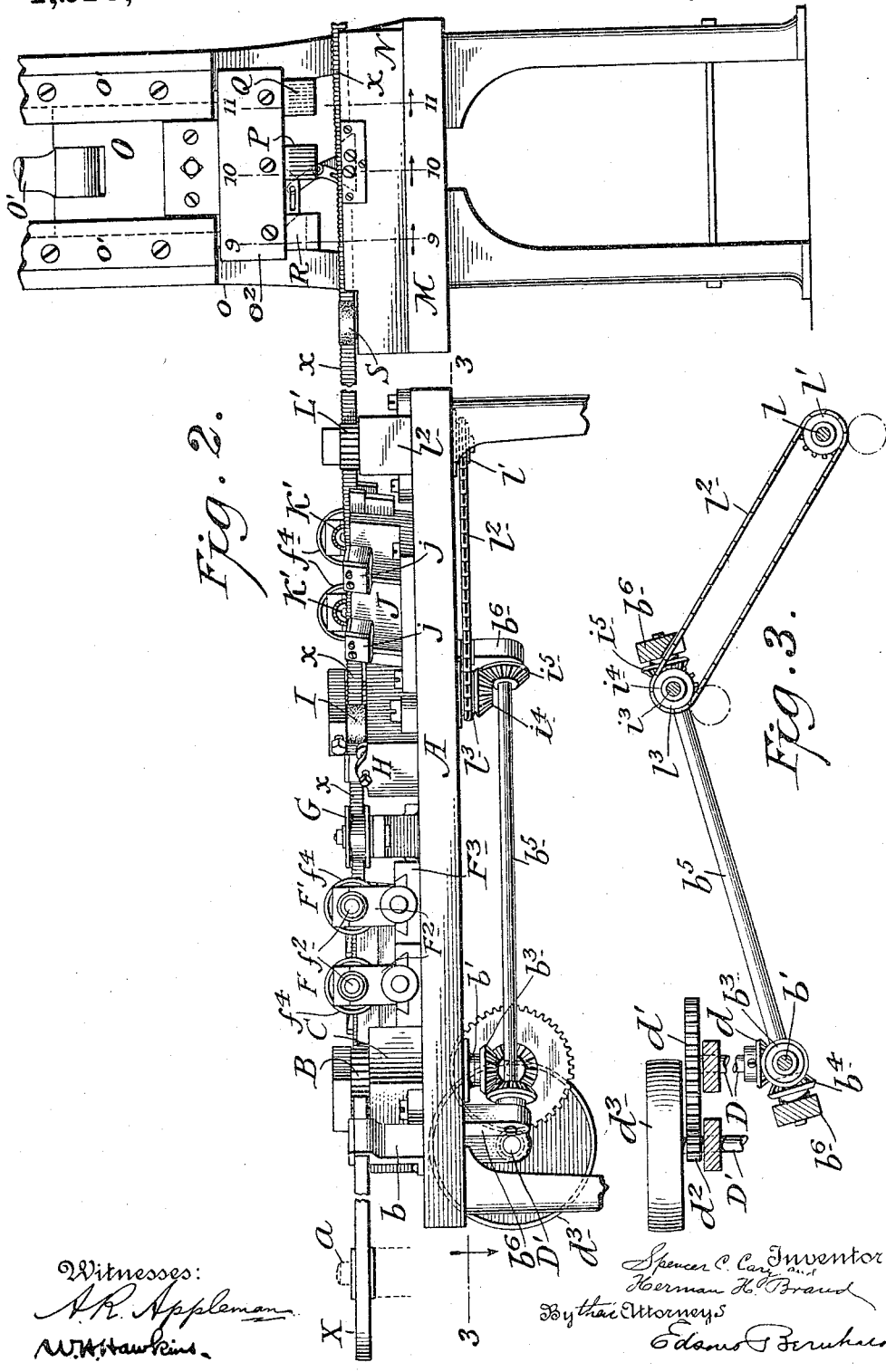

UNITED STATES PATENT OFFICE.

SPENCER C. CARY AND HERMAN H. BRAND, OF BROOKLYN, NEW YORK, ASSIGNORS TO CARY MANUFACTURING CO., OF BROOKLYN, NEW YORK, A CORPORATION OF NEW YORK.

MACHINE FOR PRODUCING CORRUGATED FASTENERS.

1,210,416.   Specification of Letters Patent.   Patented Jan. 2, 1917.

Application filed December 31, 1913. Serial No. 809,617.

*To all whom it may concern:*

Be it known that we, SPENCER C. CARY and HERMAN H. BRAND, both citizens of the United States, residing at the city of New York, borough of Brooklyn, county of Kings, and State of New York, have invented a certain new and useful Machine for Producing Corrugated Fasteners, of which the following is a specification.

This invention is a machine for producing fasteners of that kind known in the trade as "corrugated fasteners", the same being now used extensively for uniting the parts of boxes, shooks, furniture, and various other wooden articles.

It is usual to produce the corrugated material either in the form of a continuous strip or in short individual fasteners, the width of which may vary. Furthermore, the corrugated strips or individual fasteners are provided with teeth, the driving edge or points of which should be, and preferably are, sharpened so that the strip or fastener will readily penetrate the wood, particularly if driven across the grain thereof.

Fasteners of the kind mentioned have been produced by one method or another, but in all such prior modes of procedure it has been necessary, at least in part, to grind the edge or the teeth for the purpose of sharpening the same, thereby imparting to the fastener a capacity for entering the wood.

The object of the present invention is to produce fasteners automatically, rapidly and economically, such fasteners being provided with sharpened driving edges or teeth without grinding such edges thereon, whereby the extra operation of grinding the teeth and the expense incident thereto are saved.

According to this invention, a strip of plain metal stock, of the required gage, is fed continuously to a corrugating mechanism, preferably a pair of coöperating rolls which bend the metal stock to produce transverse corrugations therein. The resulting corrugated strip then passes to means for producing saw pointed teeth upon one edge of the corrugated stock, said tooth forming means operating in either of two ways, *i. e.*, by swaging the edge to upset or displace the metal, or by removing the metal by the action of rotary milling cutters. In the embodiment of the invention herein disclosed, the metal is cut away by rotary milling cutters, but it is not desired to limit or confine the invention to said specified tooth forming mechanism for the reason that, broadly, the tooth forming mechanism may operate either by upsetting the metal by swaging dies or by cutting away the metal by milling cutters.

In another application Serial No. 865,678, we have disclosed a practical form of mechanism wherein bevels are produced on the respective surfaces of corrugated stock by the action of swaging dies operating with compressive force so as to form said bevels adjacent one edge of the stock without actually cutting or removing metal from said stock, and thereafter the metal is cut on definite lines from the beveled surfaces so as to produce well defined saw teeth.

Two pairs of milling cutters are employed, said cutters operating to remove the metal from the respective sides of the strip at one edge thereof, so as to produce, more or less roughly, the required teeth, one pair of said rotary cutters acting upon one face of the strip to produce a bevel thereon, whereas the other of said rotary cutters operates upon the other face of the strip to bevel it, the two bevels thus produced being reversed to each other and resulting in the pointed teeth at one edge of the corrugated strip, all the points of said teeth being in a plane substantially midway between planes at the respective side faces of the fastener.

It is found that the practical operation of reversely beveling the side faces of the metal strip either by displacing the metal by the action of swaging dies or by the operation of the rotary milling cutters, the latter being usually driven at comparatively high speed, results in the formation, more or less frequently, of a bur of rough jagged edge either along the sides of the teeth or at the points thereof, but more generally in the throats or spaces at the bottoms of the teeth. Such bur or jagged edge is, of course, an undesirable, although perhaps an unavoidable, feature when the corrugated strip is toothed by rotary milling cutters, or by swaging the edge of the metal, and an essential part of this invention consists of means for removing such bur or jagged edge subsequent to the operation of producing the saw teeth upon the edge of the corrugated strip. In the embodiment of the bur removing means, a plurality of clearing dies are employed, in one of which dies the toothed corrugated strip is presented at an angle, whereas in the other die the same strip is presented at an opposite angle, said dies acting upon the teeth to strip the bur thereof from said teeth, particularly at the throats between them, as a result of which operation sharp edges are produced on the teeth so that they will readily penetrate the wood.

While the foregoing mechanisms operate upon the stock for producing corrugated saw tooth fasteners, it may be desirable to employ additional mechanism for imparting sharp edges to the points of the teeth. Such additional mechanism consists of a swaging die operating upon the points of the teeth, and it may be, and preferably is, positioned intermediate the tooth forming mechanism and the bur-removing dies, so that the swaging die will impart a true form and sharp edge to the points of the teeth, either subsequent or prior to the operation of the bur-removing dies on the toothed strip.

The stock is fed continuously between the corrugating rolls and to the tooth forming mechanism, whereas a certain amount of slack is maintained in that length of the corrugated and toothed part of the resulting strip, which length is to be acted upon by the clearing dies and by the swaging die should the latter be employed, suitable feed means being used to advance the slack part of the strip through the dies at the proper or necessary intervals.

The complete operation is carried on automatically, the only manual attendance necessary being to insert the coil of stock material into the machine and to remove the coil of treated material from the machine, but should it be desired, the treated material may be severed, by suitable cutters, into fasteners of the required lengths.

The drawings hereto annexed illustrate a practical embodiment of the invention, in which—

Figure 1 is a plan view of a machine embodying the present invention. Fig. 2 is an elevation looking toward the left in Fig. 1. Fig. 3 is a sectional plan view of the means for imparting rotary motion to the corrugating mechanism and certain guiding and feed rolls, the plane of the section being indicated by the dotted line 3—3 of Fig. 2. Fig. 4 is a vertical sectional elevation through the stock corrugating mechanism in the plane of the dotted line 4—4 of Fig. 1. Fig. 5 is an elevation, partly in section, of one of the rotary milling cutters. Fig. 6 is a plan view, partly in horizontal section, of one of the stock guiding devices positioned in operative relation to a set of rotary milling cutters. Fig. 7 is a side elevation of the stock guiding means shown in Fig. 6. Fig. 8 is a vertical cross section in the plane of the dotted line 8—8 of Fig. 7 illustrating one of the rotary milling cutters. Fig. 9 is a vertical section partly in elevation in the plane of the dotted line 9—9 of Fig. 2 illustrating the swaging die in position for operation upon the points of the teeth of the corrugated strip. Figs. 10 and 11 are cross sections one the lines 10—10 and 11—11 respectively of Fig. 2, illustrating two bur removing dies and the guides for the corrugated strip, which guides operate to present the corrugated strip at different angles of inclination to the path of movement of the respective bur removing dies. Fig. 12 is a perspective view of one of the bur removing dies. Fig. 13 is an edge view of the corrugated strip before the bevels are cut thereon to produce the teeth. Fig. 14 is a side elevation of the corrugated and toothed strip showing the physical condition of said strip subsequent to the operation of the rotary milling cutters on one edge thereof. Fig. 15 is a side elevation similar to Fig. 14 subsequent to the operation of the bur removing dies upon the beveled teeth and the throats between said teeth.

A designates a table supported at a height convenient to the operator and constructed to carry the stock guiding means and the rotary milling cutters, the latter being herein disclosed as one embodiment of means for producing saw teeth on the edge of the corrugated stock by removing or cutting away the metal. The material to be treated is contained in a coil X which is supported for free rotation on a spindle $a$, the latter being held by suitable means at an end portion of the table. The material passes from the coil X and through a fixed guide $b$ attached to the table adjacent to the coil, and from this guide the strip or length of material passes directly between the stock corrugating mechanism, herein shown as a pair of coöperating toothed rollers B B', see Figs. 1 and 4. The toothed corrugating rollers are attached rigidly to vertical shafts $b'$ $b^2$, one of which shafts extends downwardly through its bearing in the table A so that the lower protruding part of the shaft is provided with a beveled gear $b^3$. One of the corrugating rolls is adjustable relative to the other roll in order that the coöperating rolls may be adapted for operation upon the stock the gage or thickness of which varies, and to this end the shaft of one roll is mounted in adjustable bearings $c$, whereas the shaft $b'$ of the non-adjustable roll is in a stationary bearing $c'$. The bearings for the shafts of the corrugating rolls are attached in suitable ways to a roll housing C mounted on table A, and this roll housing is provided with a guideway $c^2$ for the adjustable bearing $c$, the latter being shifted in the guideway by a screw $c^3$. Rotary motion is imparted to the coöperating corrugating rolls by gear $b^3$ meshing with a bevel gear $b^4$ of a countershaft $b^5$, the latter being journaled in the bearings of suitable hangers $b^6$ depending from the table A. Shaft $b^5$ is driven by a bevel gear $d$ on a drive shaft D, the latter extending outwardly with respect to shaft $b^5$, see Fig. 3. On this drive shaft D is a gear $d'$ meshing with a gear $d^2$ on a pulley shaft D', said shaft having a pulley $d^3$ adapted to be driven by a belt (not shown). The shaft $b^5$ imparts rotary motion to roll shaft $b'$, and as the two rolls B B' mesh it follows that the roll B' will rotate in unison with the driving roll B, the teeth of the two rolls operating upon the strip of stock $x$ so as to impart the desired corrugations thereto. It should be stated that the adjustable bearings $c$ for the shiftable corrugating roll B' is supported in a slide $D^2$, shown more particularly in Fig. 4. This slide is provided with a slot $d^4$ through which passes a bolt $d^5$, the latter being secured in a stationary part $d^6$ of the roll housing C. The sliding part $D^2$ for the lower shaft bearing $c$ is shiftable back and forth within the roll housing by the operation of a screw $D^3$.

The toothed rolls B B' perform the twofold function of corrugating the metal strip and feeding said strip at a required rate of speed, the coil X rotating freely on the arbor $a$ so as to allow the metal stock to be drawn forward by the corrugating and feeding rolls.

After leaving the corrugating rolls the strip passes into a guide E so as to be operated upon by the tooth forming mechanism, the same being herein shown as a plurality of rotary milling cutters F, F'; thence the corrugated strip passes around a direction roller G, thence the corrugated strip passes through another guide H, thence between a pair of feed rolls I, I', thence into another guide J so as to be operated upon by another pair of rotary milling cutters K K', thence between a pair of feed rolls L L' and thence to other guides, whereby the corrugated and toothed strip is operated upon by the swaging die and by the bur removing dies to be hereinafter described.

With this brief statement of the direction of feed of the corrugated strip and the operations to be performed thereon by the several mechanisms, a description will now be given of the detail construction and mode of operation of said mechanisms.

The guides E J are positioned at the respective sides of the direction roller G, but said guides E J are inclined with respect to the roller and they are inclined reversely to each other, so that the corrugated strip will be fed in inclined paths, one of said paths being determined by the guide E, whereas the other path is determined by the guide J, the strip extending continuously through the machine, so that the operations will be performed successively on the strip by the cutting mechanisms, feeding mechanisms, the swaging die and the bur removing dies. Said stock guides E J are similar in construction, although they are reversely positioned, so that a description of one guide will answer for the other. The stock guide is shown in detail in Figs. 6 to 8, inclusive, of the drawings, by reference to which it will be seen that the frame part of the stock guide consists of a base member $e$ and an upstanding member $e'$. The base member is provided with slots $e^2$ through which are passed clamping bolts $e^3$ for the purpose of rigidly holding the base member in a predetermined position upon the table A. The upstanding member $e'$ of the stock guide frame is provided with a recess $e^4$ in which is positioned a bearing plate E', and to this bearing plate are fastened other plates $E^2$, the latter being provided with notches $e^5$ within which are adapted to operate the rotary milling cutters. The corrugated strip is fed through a longitudinal channel $e^6$ which is provided in the upstanding member $e'$ and is bounded in part by the plates E, $E^2$, the back edge of the corrugated strip being in contact with the top edge of the longitudinal plate E'. One wall of the longitudinal channel $e^6$ for the corrugated strip is formed by a backing plate $e^7$ positioned within the recess $e^4$ and in contact with the top edge of plate E', and as the strip is moved in the direction of its length through the channel $e^6$ of the stock guide, said strip is in contact with the plates $E^2$ $e^7$ and E', whereby the strip is supported on all of its sides and one of its edges by the stock guide and at the same time the strip is presented along its top marginal edge to the recesses $e^5$ in the plates $E^2$ so that one set of milling cutters will operate upon one face of the strip at one edge thereof so as to produce a bevel on the strip by the operation of the milling cutters. The milling cutters for one stock guide act on one face of the strip so as to produce a bevel thereon, but at this time pressure is applied to the opposite face of the strip by suitable spring pressed slides so as to prevent the strip from being thrust away from, or out of the path of, the cutters by the action of the cutters themselves. Accordingly, each stock guide is provided with movable spring pressed plates J' which correspond in number to the milling cutters and are positioned opposite to the notches $e^5$ within which operate said milling cutters. Said spring pressed plates are slidably confined within guides $j$ rigidly connected with the upstanding member $e'$ of the guide framework. Said movable pressure plates are acted upon by springs $j'$, the tension of which is adapted to be regulated by the adjustment of screws $j^2$, and with each pressure plate coöperates a screw $j^3$ for regulating the position of said plate with respect to the path of feed of the corrugated strip. As shown, each screw $j^3$ is screwed into an opening provided in the pressure plate, the screw being loose in a suitable opening provided in the guide $j$, whereby the extent of movement of the pressure plate under the tension of spring $j'$ is adapted to be regulated or determined by the adjustment of screw $j^3$.

It will be noted from the foregoing that the milling cutters for one stock guide operate upon one face of the corrugated strip, whereas the other face of the corrugated strip is engaged by the spring pressed plates J′, the latter operating primarily to exert pressure upon the corrugated strip as will retain the latter in the path of the milling cutters and thus prevent said cutters from thrusting the corrugated strip out of the way of the teeth on the cutters.

The milling cutters F F′ operate upon one and the same face of the corruguated strip and they are in coöperative relation to the parts composing the stock guide E. The other milling cutters K K′ operate upon the opposite face of the corrugated strip, and said cutters K K′ are in coöperative relation to the other stock guide J. The construction and operation of said stock guide J is similar in all respects to stock guide E. The stock guide E and cutters F F′ operate upon one portion of the corrugated strip as said strip passes from the corrugating rolls B B′ to and around the direction roller G, whereby the cutters F F′ act to produce a bevel upon one face only of the corrugated strip as it moves in one inclined path. As the corrugated strip moves around the roll G, the direction of the path of movement of said corrugated strip is reversed so that it travels in a second inclined path, the inclination of which is reversed to that of the path pursued by the strip as it passes through the stock guide E and is operated upon by cutters F F′. The guide H and the two sets of feed rolls I I′ and L L′ respectively direct and feed the corrugated strip in a reversely inclined path and at this time or while pursuing this path the corrugated strip is fed through the stock guide J and is acted upon by the cutters K K′. As one set of cutters F F′ acts to bevel the corrugated strip on one face thereof, the other set of cutters K K′ act to impart a bevel to the opposite face of the corrugated strip, the latter being fed continuously in one direction and at the required speed. Accordingly, the cutters F F′ are positioned on one side of the path of feed of the corrugated strip, whereas the other cutters K K′ are positioned at the opposite side of the path of feed of said strip. Similarly, the stock guides E J are at the respective sides of the path of feed of the strip, and the spring pressed plates of the respective stock guides are normally forced by their springs into coöperative relation to the respective cutters, the pressure plates of the guide E moving in an opposite direction to the pressure plates of the guide J.

Each cutter is of the form shown more particularly in Fig. 5. Said cutter consists of a substantially circular member provided with teeth $f$, one end of said teeth being beveled at $f'$. The cutter is on a rotary spindle $f^2$ supported in suitable bearings $f^3$ of a frame $F^2$, said spindle being provided with a pulley $f^4$. The frame $F^2$ is fitted slidably on a bed plate $F^3$, the latter having an upstanding lug $f^5$ in which is mounted a screw spindle $F^4$. Said spindle has threaded engagement with the slidable frame $F^2$, and it is provided with a hand wheel $f^6$ whereby the rotation of the screw will impart sliding adjustment to the frame $F^2$ and the cutter so that the position of the cutter with respect to the path of feed of the corrugated strip may be varied. As shown in Fig. 1, the cutters F F′ and K K′ are inclined to the path of feed of the corrugated strip, and the beveled ends $f'$ of the toothed cutters act upon an edge portion of the corrugated strip so as to produce the required bevels upon the respective faces of said strip, as a result of which the strip is beveled reversely on its two faces and teeth are formed on said edge of the strip, the points of which teeth are in a plane substantially midway between the two planes which intersect the crests of the corrugations on the respective faces of the strip, whereby the points of the teeth are positioned in the plane of the medial line of the corrugated strip.

The direction roller G is positioned between the stock guides E H so that the corrugated strip in passing around this roller G will be so guided that its respective lengths will move in oppositely inclined paths.

The feed rolls I I′ and L L′ are positioned at the respective sides of the stock guides heretofore described and the rotating cutters K K′. As shown, the feed roll I′ is corrugated, whereas the feed roll I is a smooth faced roll, although it is evident that said smooth faced roll I may be corrugated similarly to the roll I′. The roll I is on a shaft which is mounted in a sliding bearing $i'$ adapted to be adjusted by a screw $i^2$, but the shaft $i^3$ of the non-adjustable roll I′ is mounted in a stationary housing $i$, said shaft being extended downwardly below its bearing in the table, for the purpose of receiving a beveled gear $i^4$, the latter meshing with a bevel gear $i^5$ on the shaft $b^5$, whereby said shaft $b^5$ will impart rotary motion to the coöperating feed rolls I I′.

The other feed rolls L L' are constructed and operated similarly to the feed rolls I I', that is to say, the shaft $l$ of feed roll L is extended below its bearing in housing $l^6$ to receive a sprocket wheel $l'$, the latter being engaged by a sprocket chain $l^2$ which is operated by a sprocket member $l^3$ on the shaft $i^3$ whereby the sprocket chain $l^2$ will transmit the motion of shafts $b^5$ $i^3$ to the shaft $l$ for the purpose of positively driving the feed roll L. The other feed roll L' is on a shaft $m$ mounted in a slide $m'$ adapted to be adjusted by a screw $m^2$ within the roll housing $L^2$. The feed rolls I I' and L L' are operated at the same speed as the corrugating and feed rolls B B' for the purpose of advancing the corrugated strip at the required speed through the stock guides E J and relative to the rotary milling cutters.

In operation the cutters F F' and K K' are rotated in a direction to force the corrugated strip against the backing plates E' in the stock guides E J, but as the strip has edgewise contact with the backing plates and is laterally supported by the walls of the channels $e^6$ in the stock guides and by the movable pressure plates, said corrugated strip is prevented from being forced out of position by the operation of the milling cutters, the latter being driven at high speed. The beveled ends $f'$ on the teeth of the rotary cutters act upon the respective faces of the corrugated strip so as to remove the metal with minimum friction, thus making easy, comparatively speaking, the operation of the cutters. By providing the bevels $f'$ on the teeth of the cutters, said cutters can be removed and resharpened as required, the cutters being removed from the spindles, thus prolonging the durability and life of the cutters.

The operation of the milling cutters upon the corrugated strip results in bevels which produce the teeth in the manner described, but it is found that the edges of the teeth, and particularly the throats between the teeth, are not smooth, but on the contrary, the edges of the teeth and their throats are more or less rough, jagged or uneven as graphically shown in Fig. 14, the latter representing a side view of the corrugated strip after the operation of the milling cutters upon an edge portion thereof. In commercial fasteners, it is necessary that the edges of the saw teeth and the throats between the same shall be smooth, even and regular in order that the fastener may be driven into the wood or other material, and, accordingly, my invention embodies means for operating upon the corrugated strip subsequent to the action of the milling cutters thereon, which subsequent operation removes the bur or rough edge from the teeth and the throats between the same.

Adjacent to the table A, or forming an extension or continuation thereof, is a supplemental table M, the same being provided with a bed plate N in which is a longitudinal channel $n$. The longitudinal channel $n$ is so positioned with reference to the feed rolls L L' that the corrugated and toothed strip will pass from the feed rolls into the channel $n$, whereby the corrugated and toothed strip is retained in position and is presented to the clearing dies and a swaging die should the latter be used. Extending upwardly from the table M and the bed N thereon is a frame $o$ provided with vertical guides $o'$ for a crosshead O, to which reciprocating motion is imparted by suitable means, such as the pitman O' connected to the head. The lower part of the head is enlarged at $o^2$ for the purpose of carrying clearing dies P Q, and if desired a swaging die R. It is preferred to use the swaging die R and to position it on the reciprocating head O for movement over a part of the channel $n$ in the bed N, but this swaging die may be omitted should it be desired to dispense with the operation of swaging the saw teeth on the strip. As shown more particularly in Fig. 9, the swaging die is provided with a substantially V-shaped recess $r$ in the under face of said die, and the die is at suitable times forced downward upon the teeth of the corrugated strip for the purpose of swaging the points of said teeth, thereby imparting sharpened edges to the points of the teeth on the corrugated strip. The walls of the channel $n$ in that section of the bed N below the swaging die are parallel to each other and positioned vertically, said walls being perpendicular to the top face of the bed N. The bur removing dies P Q, shown respectively in Figs. 11 and 12, are positioned on the cross-head O to extend downwardly from the head $o^2$ thereof, the die Q being rearwardly of the die P and both of said dies being in operative relation to the channel $n$ through which the corrugated stock is fed. Each bur removing die P or Q consists of a block provided on one face thereof with a series of grooves $p$ corresponding substantially in shape to the corrugations produced in the metal strip, but a characteristic feature of the invention is that the corrugated strip is presented at one angle of inclination to one die P, whereas the angle of inclination of the corrugated strip when presented to the other die Q is reversed. This is obtained by inclining the walls of the channel $n$ in one direction, as shown in Fig. 11, below the die P, whereas the walls of the channel below the die Q are inclined in an opposite direction, as shown in Fig. 10. Accordingly, the channel $n$ in one section thereof has its walls inclined in one direction, whereas in another section of the channel the walls are oppositely inclined, as shown respectively in Figs. 10 and 11, but the channel is continuous so that the corrugated strip will pass uninterruptedly through the channel of the bed N. By inclining the stock to the direction of movement of the clearing die the grooved faces of the dies are adapted to act on the edges and throats of the teeth formed by the opposite bevels on the edge portion of the corrugated strip. Thus, the die Q will act on the edges and throats of the teeth formed by the bevel on one face of the corrugated strip, whereas the other die P will in a similar manner act on the edges and throats of the teeth formed by the other bevel on the strip. In operation, the dies P Q and R act simultaneously upon the toothed edge of the strip when the crosshead O moves downwardly, the corrugated strip being at rest at this time, whereby the die R will swage the points of the teeth, the die Q will remove the bur from one beveled face of the teeth, and the die P eliminates the bur from the other beveled face of the teeth, as a result of which the edges and throats of the teeth will be smooth, uniform and sharp, as clearly shown in Fig. 15 and the points will be swaged to a sharpened edge resulting in the commercial fastener shown in Fig. 15.

The dies P, Q, perform an important function in addition to the operation of removing the burs or rough edges from the edges of the teeth and the spaces between said teeth, such function consisting in shearing the edge of the corrugated strip at the bases of the teeth and in the concave portions of the corrugated stock.

It is apparent from the foregoing description that the rotary milling cutters F, F' and K K' operate upon the respective surfaces of the corrugated strip adjacent the edge portion thereof so as to cut away metal in two directions inclined oppositely to each other, thus resulting in well defined saw teeth, the edges of which teeth and the edges of the spaces between which teeth are left with burs. Thereafter, the dies P, Q, are operated to shear past the edges of the spaces between the teeth and the edges of the teeth themselves to remove the burs and thus render smooth the edges of the teeth, and it is at this time that said dies P, Q act on the edge of the stock in the concave portions thereof so as to shear the edge of the metal at the bases of the teeth for producing bevels in the concave portions of the stock.

Each die P, Q is provided with a corrugated face, see the face $p$ of die P in Figs. 11 and 12 and the face $p$ of the die Q in Fig. 10, which corrugated faces of the dies conform to the corrugations of the metal stock, whereby the corrugated edge portions of the dies P, Q are adapted to work in the spaces of the teeth and to shear past the edges of the teeth and also to shear the corrugated stock at the bases of the teeth. Thus, in Fig. 10, the stock is presented at an angle of inclination to die Q, whereas in Fig. 11 the stock is presented at a reversed angle of inclination to die P, and the two said dies are reciprocated in such relation to the corrugated stock that said edges of the corrugated die faces $p$ will operate not only upon the edges of the teeth but will shear the edge of the corrugated stock at the bases of the teeth (see Figs. 10 and 11) whereby smooth edges are produced on the teeth and bevels are produced on the edge of the stock, in the concave portions thereof adjacent the bases of the teeth.

When the corrugated strip is presented to the cutters, it is advanced continuously by the corrugating rolls and the sets of feed rolls, but owing to the reciprocating movement given to the clearing dies and the swaging die by the action of the head O it becomes necessary to move the corrugated and toothed strip intermittently, whereby the strip is at rest when the dies P Q and R act upon the teeth. This requires an intermittent feed movement, one means for securing which is shown in Figs. 1 and 2. On the table M is supported a pair of coöperating feed rolls S S', the same being preferably corrugated for engagement with the corrugated strip. One feed roll is provided with a ratchet $s$ with which engages a pawl $s'$ on a reciprocating feed bar T, the latter being slidable in a fixed guide $t$. Suitable means are provided for imparting motion to this feed bar T, and this reciprocating movement is communicated by the pawl $s'$ to the ratchet of feed roll S'. During the upstroke and a part of the downstroke of head O and the dies attached thereto, the feed bar T is operated so as to rotate rolls S S' and thereby move a section or length of the corrugated and toothed strip into the channel $n$ and below the dies, but just prior to the action of the dies upon the teeth of the corrugated strip the feed rolls are not moved, thus allowing the strip in the channel to be at rest, whereupon the dies act thereon in the manner and for the purposes stated. Of course, there should be a permanent allowance of abundant slack between the feed rolls L L' and the feed rolls S S' so that the strip may be fed continuously to the milling cutters and the intermittent feed may be given to said strip in order to present the same to the clearing dies and the swaging die.

The operation is as follows: The plain stock of coiled material is placed upon the arbor $a$, and inserted into the guide $b$ and corrugating rolls B B', the stock passing through the channel of guide E, around the direction roll G, through the guide H, between feed rolls I I', through the channel of guide J, between the feed rolls L L' and S S' so as to secure a permanent allowance of slack, and thence through the channel $n$ of the bed N. Rolls B B' operate upon the strip to produce the desired corrugations therein. The cutters F F' operate on one face of the strip to bevel the latter in one direction, whereas the cutters K K' operate upon the opposite face of the strip for imparting another bevel to said strip, the second bevel being reversed to the first bevel. The reversed bevels form the saw teeth upon one edge of the corrugated strip, but the edges of these teeth and the throats between them are more or less rough, as shown in Fig. 14. The stock passes through the channel $n$ so as to present one length of stock at one angle to the die P and another length of stock at a different angle to the die Q, said dies operating on the oppositely beveled faces to remove the bur or rough edge from the teeth and the throats between them. When the die R is employed it acts on the teeth so as to impart sharp points to the teeth.

The corrugated and toothed strip treated in the manner described may be coiled by suitable mechanism or it may be cut into individual fasteners by other mechanism, but as the coiling and cutting mechanisms form no part of the present invention, we have not considered it necessary to illustrate or describe the same.

Having thus fully described the invention, what we claim as new, and desire to secure by Letters Patent is:

1. In a machine for making saw-tooth corrugated fasteners, the combination with means for feeding a strip of corrugated stock material, of rotary milling cutters one of which is positioned for operation upon one face of the stock material and the other is positioned for operation upon the opposite face of the stock material, the axis of rotation of each milling cutter being inclined to the path of feed of the stock material.

2. In a machine for producing corrugated fasteners, the combination with beveling means for producing oppositely inclined surfaces upon corrugated stock adjacent an edge portion thereof, of reciprocating dies provided with corrugated surfaces conforming to said corrugated stock, said dies being operable upon the edge portion of the resulting saw teeth and upon the edge of the corrugated stock to produce bevels in the concave surfaces of said stock.

3. In a machine for producing corrugated fasteners, the combination with means for producing bevels upon the respective faces of corrugated stock adjacent an edge portion thereof, of reciprocating dies provided with corrugated faces, and means for presenting the dies and the corrugated stock at an angle relatively to each other said dies operating upon the edge portions of the resulting saw teeth produced on the stock, for eliminating roughnesses or burs upon said saw teeth.

4. In a machine for making saw-tooth corrugated fasteners, the combination with means for feeding a strip of corrugated stock material, of rotary milling cutters each having a cutting face rotating in a plane inclined to the surface of the stock material to be operated upon.

5. In a machine for making saw-tooth corrugated fasteners, the combination with means for feeding a strip of corrugated stock material, of milling cutters positioned for operation upon one face of the corrugated stock material, said cutters having cutting faces rotating in planes inclined to one surface of the stock material to be operated upon, and other milling cutters positioned for operation upon the opposite surface of said corrugated stock material, said second named cutters having cutting faces rotating in planes inclined to the opposite surface of the stock material.

6. In a machine for making saw-tooth corrugated fasteners, the combination with means for feeding a strip of corrugated stock material, of rotary milling cutters positioned for operation upon the respective faces of the stock material for producing reversed bevels thereon, each milling cutter being rotatable on an axis inclined to the path of feed of the stock material and each cutter having teeth the ends of which are beveled.

7. In a machine for making saw-tooth corrugated fasteners, the combination with means for feeding a strip of corrugated stock material, and means for producing teeth upon an edge portion of said stock material, of bur-removing dies reciprocable in a path inclined to the medial plane of the corrugated strip, said dies acting upon the material in the throats of the teeth for eliminating the rough edges produced upon the teeth by the operation of said tooth forming means.

8. In a machine for making saw-tooth corrugated fasteners, the combination with means for feeding and guiding a strip of corrugated stock material, and means for beveling an edge portion of said stock material to produce teeth thereon, of bur-removing dies for eliminating rough edges from said teeth on the stock material, said stock feeding and guiding means and said bur-removing dies coöperating for the dies to act upon the rough edges of the metal stock in a plane inclined to the medial line of the corrugated stock material.

9. In a machine for producing corrugated fasteners, the combination with means for cutting corrugated stock upon the respective surfaces and adjacent an edge portion thereof to produce teeth thereon, of reciprocating dies provided with corrugated faces, said dies operating for the corrugated faces thereof to shear the metal upon the edges of said teeth.

10. In a machine or making saw-tooth corrugated fasteners, the combination with means for feeding and guiding a strip of corrugated stock material, and means for beveling an edge portion of said stock material to produce teeth thereon, of bur-removing dies reciprocable with respect to the path of feed of said stock material, each die being movable in a path inclined to the medial line of the corrugated stock material and said dies operating upon the teeth and in the throats between said teeth for eliminating rough edges therefrom.

11. In a machine for producing corrugated fasteners, the combination with means positioned for contact with the respective faces of corrugated stock adjacent an edge portion thereof so as to produce oppositely inclined bevels upon said edge portion, of reciprocating dies provided with faces corresponding to the corrugations of the stock, and means for positioning the stock in a path inclined to the line of movement of said dies.

12. In a machine for making saw tooth corrugated fasteners, the combination with means for feeding a strip of corrugated stock material, of rotary milling cutters the axes of which are inclined relatively to the line of feed of the corrugated stock for producing teeth thereon, and dies reciprocable relative to the path of the stock for operation upon the teeth of said stock.

13. In a machine for making saw tooth corrugated fasteners, the combination with means for feeding a strip of corrugated material, of milling cutters rotatable in planes inclined relatively to the path of feed of the corrugated stock material for producing teeth upon an edge portion of the stock, and bur-removing dies operating subsequently upon the teeth of said stock.

14. In a machine for making saw tooth corrugated fasteners, the combination with means for feeding a strip of corrugated stock material, and mechanism for producing teeth upon an edge portion of the stock, of bur-removing dies reciprocable relative to the path of feed of the stock, and stock guiding means for presenting different portions of the stock at opposite angles to said dies.

15. In a machine for making saw tooth corrugated fasteners, the combination with mechanism for producing teeth upon an edge portion of corrugated stock, of a plurality of bur-removing dies reciprocable with respect to the path of the stock, each die having a corrugated working edge, and stock-guiding means operating to direct successive lengths of the stock at opposite angles of inclination relative to the direction of movement of the dies.

16. In a machine for making saw tooth corrugated fasteners, the combination with mechanism for producing teeth upon an edge portion of a strip of corrugated stock material, of a die movable into contact with the teeth on one surface thereof, stock guiding means for presenting the toothed stock at a predetermined angle of inclination to said die, a second die movable into contact with the teeth at the opposite surface thereof, and a second guide for presenting stock at an opposite angle of inclination to said second die.

17. In a machine for making saw tooth corrugated fasteners, the combination with means for feeding a strip of corrugated stock material, and mechanism for producing teeth upon an edge portion of a strip of corrugated stock material, of a plurality of dies operating upon successive portions of said toothed stock and contacting respectively with the reversed bevels thereon for removing rough edges from said teeth, a plurality of stock guides in coöperative relation to said dies and operating to present successive portions of the stock at opposite angles of inclination to said dies, and means for feeding the stock through said dies.

18. In a machine for making saw tooth corrugated fasteners, the combination with means for feeding a strip of corrugated stock material, and mechanism for producing teeth upon an edge portion of a strip of corrugated stock material, of a plurality of reciprocating dies in operative position to the path of the toothed stock, stock guides in coöperative relation to said tooth-producing means, and means for producing relative movement between the dies and stock guides so as to secure contact of the dies with the teeth on the stock.

19. In a machine for making saw tooth corrugated fasteners, the combination with means for beveling the respective sides of a corrugated strip to produce teeth on one edge portion thereof, of reciprocating clearing dies positioned for contact successively with the respective bevels upon said toothed strip, said dies operating upon the teeth to remove rough edges from the spaces between points of said teeth.

20. In a machine for making saw tooth corrugated fasteners, the combination with means for beveling the respective sides of a corrugated strip to produce teeth on one edge portion thereof, of clearing dies positioned at the respective sides of the path of said toothed corrugated stock, and stock guides in coöperative relation to the clearing dies and operating to present successive portions of said corrugated strip at reversely inclined positions to the successive dies whereby the dies act on both bevels of the teeth for removing rough edges from the teeth between the points thereof.

21. In a machine for making saw tooth corrugated fasteners, the combination of mechanism for producing teeth on a corrugated stock, of a swaging die movable relative to the path of said stock and operable upon the points of said teeth for shaping the latter to a sharp edge.

22. In a machine for making saw tooth corrugated fasteners, the combination of stock corrugating means, mechanism for beveling an edge portion of the stock to produce teeth thereon, a swaging die movable into contact with the teeth of said strip, and clearing dies reciprocable with respect to the path of said corrugated toothed strip.

23. In a machine for making saw tooth corrugated fasteners, the combination of stock feeding means, corrugating means, mechanism operating upon an edge portion of the stock for producing teeth thereon, a swaging die reciprocable with respect to the path of said toothed corrugated stock, and clearing dies positioned for contact with the teeth of said stock for removing rough edges therefrom.

24. In a machine for making saw tooth corrugated fasteners, the combination of corrugating means, a plurality of rotary cutters, means for feeding stock continuously to said corrugating means and the cutters, and clearing dies overhanging the path of the corrugated toothed strip.

25. In a machine for making saw tooth corrugated fasteners, the combination of corrugating means, a plurality of rotary cutters, means for feeding stock continuously to said corrugating means and the cutters, clearing dies overhanging the path of the corrugated toothed strip, a swaging die movable into contact with the points of the teeth on said stock, and means for feeding the corrugated toothed stock to said clearing dies and the swaging die.

In testimony whereof we have signed our names to this specification in the presence of two subscribing witnesses.

SPENCER C. CARY.
HERMAN H. BRAND.

Witnesses:
M. C. RODRIGUEZ,
H. I. BERNHARD.

Copies of this patent may be obtained for five cents each, by addressing the "Commissioner of Patents, Washington, D. C."